Patented Sept. 8, 1953

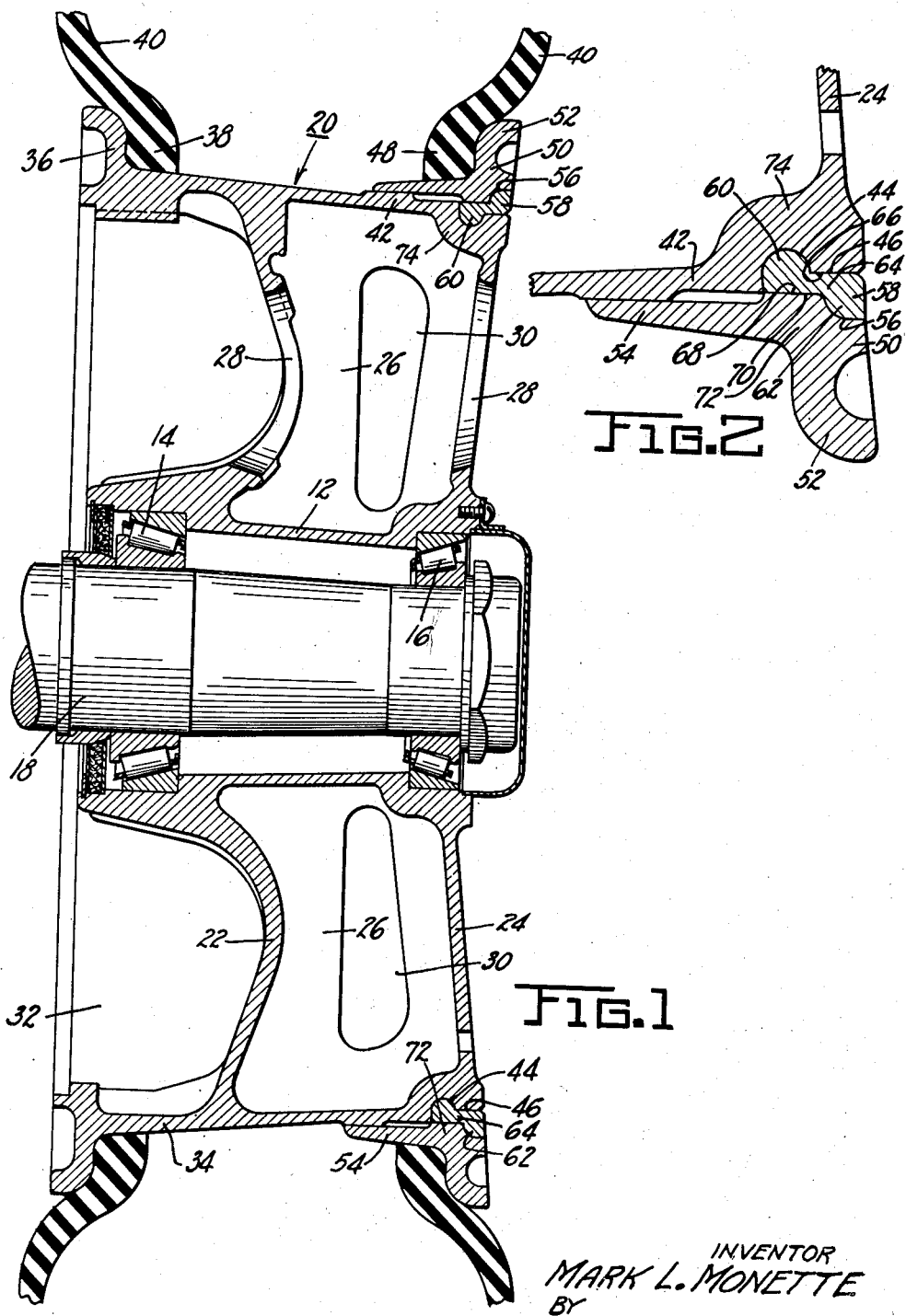

2,651,348

UNITED STATES PATENT OFFICE 2,651,348

WHEEL RIM CONSTRUCTION

Mark L. Monette, South Bend, Ind., assignor to Bendix Aviation Corporation, South Bend, Ind., a corporation of Delaware Application December 23, 1947, Serial No. 793,470

4 Claims. (Cl. 152—410)

This invention relates to the construction of a wheel rim, and particularly to an improved flange-retaining-ring which holds the separable flange in place after the tire has been mounted on the wheel.

The primary object of the present invention is to so construct the retaining ring that the separable flange with which it cooperates can be made particularly strong where strength is most needed, i. e., at the corner which joins the radially-extending portion of the flange to the axially-extending portion. The added strength of the separable flange is obtained without extending the wheel rim beyond the face of the flange.

Although a particular embodiment of my invention has been described, it will be understood by those skilled in the art that the objects of the invention may be attained by the use of constructions different in certain respects from that disclosed without departing from the underlying principles of the invention.

Figure 1 is a vertical section taken through a wheel construction in which the invention is incorporated; and Figure 2 is an enlarged view of part of the section shown in Figure 1, bringing out the cross-section of the separable flange and retaining ring.

The wheel shown in Figure 1, which is used as an illustrative embodiment of the invention, is suitable for use on an airplane, and is intended for such use. However, the invention is equally applicable to any wheel construction, regardless of the service for which the wheel is intended.

The wheel shown in the drawing has a hub 12 mounted on bearings 14 and 16, which are carried by the non-rotatable stub axle 18. The rim 20 of the wheel is connected to the hub by means of disk-shaped side members 22 and 24, a plurality of angularly-spaced laterally-extending webs 26 being used to strengthen the wheel structure. In order to reduce the weight of the wheel, a plurality of openings 28 may be provided in each of the sides 22 and 24 of the wheel structure, and openings 30 may be provided in the webs 26. The left side 22 of the wheel is so formed as to provide a brake cavity 32, in which a suitable brake may be mounted, the left side 34 of wheel rim 20 extending laterally beyond side member 22 to overlie the brake cavity.

The left side 34 of the wheel rim has an integral radially extending tire retaining flange 36, which is engaged by the left tire bead 38 of tire 40. The right side 42 of rim 20 has an annular peripheral groove 44 formed therein near the outer edge of the rim. The bottom surface of groove 44 is rounded, or curved, as shown, in order to avoid having sharp corners in the wheel construction, which might promote structural failure. Between groove 44 and the adjacent edge of the rim, the diameter of the rim is reduced slightly with respect to the diameter of the center part of the rim, providing a surface 46 which supports the body of the separable-flange-retaining-ring, hereinafter described.

Tire bead 48 of tire 40 is held in place, after the tire has been assembled on the wheel, by separable flange 50. The demountable flange 50 has a radially extending portion 52 which engages the side of the tire bead, and has an axially extending portion 54 which engages the wheel rim 20. At the outer edge of the separable flange, an annular groove 56 is formed in the radially-inner surface of the flange, the groove being rounded, or curved, as shown, in order to avoid having a sharp corner in the body of the separable flange at this point.

In order to lock the separable flange 50 in position after it has been assembled on the wheel rim, a retaining ring 58 is mounted in the space between the outer edge of the wheel rim and the separable flange. Retaining ring 58 is split at one point in its circumference to permit it to be spread slightly while being assembled, the ring snapping into place thereafter. In assembling the parts, the separable flange is pushed inwardly sufficiently to permit the retaining ring to be mounted on the rim, after which the flange is moved outwardly into engagement with the ring.

Referring to the cross-sectional shape of retaining ring 58, the axially-inner edge of the ring has an integral rounded ridge 60, which fits into groove 44 provided in the wheel rim. At the axially-outer edge of the retaining ring there is an integral rounded ridge 62, which fits into groove 56 in the radially-inner surface of the separable flange 50.

The body portion 64 of the retaining ring has its radially-inner surface 66 lying against the surface 46 provided on the wheel rim, and has its radially-outer surface 68 lying against the radially-inner surface 70 of the separable flange. Preferably the retaining ring is so designed that the outer ridge 62 is higher than the inner ridge 60. Therefore, when the flange 50 is pushed onto the wheel rim sufficiently to bring groove 56 approximately opposite groove 44, an opening is provided which is larger than the combined height of the inner ridge 60 and the body portion 64 of the retaining ring, and the ring can be slipped into place without having to push the separable flange as far inwardly on the wheel rim as would otherwise be required.

With the described construction, in which the rim and flange engaging ridges of the retaining ring are located at opposite ends of the ring cross-section, maximum strength of the separable flange can be obtained in the corner section 72, where strength is most necessary because of the bending moment exerted against the radially-extending portion 52 of the flange. The improved construction of the separable flange requires that the retaining ring be embedded in the wheel rim to an extent greater than would otherwise be necessary, but this can easily and efficiently be compensated for, by designing the corner section 74 of the wheel rim with proper strength, as shown.

Although only one embodiment of the invention has been illustrated and described, various changes in the form and relative arrangements of the parts may be made to suit requirements.

I claim:

1. In a wheel construction, two radially extending side members, a wheel rim joining said side members and having an integral tire retaining flange formed on one side thereof and an annular peripheral groove formed therein near the other side thereof, said groove having in cross-section a rounded inner surface, said rim having a reduced diameter portion between the groove and the adjacent side of the rim, said reduced diameter portion constituting the outer periphery of one wheel side member and being coplanar therewith, a separable flange carried on said rim on the side opposite the integral flange and having an axially extending portion overlying the rim so as to wholly support the tire bead on that side, said separable flange having a round-bottomed groove formed in its radially-inner surface at the edge thereof, and a split retaining ring having integral oppositely facing annular rounded ridges, one of which is located at the axially-inner edge of the retaining ring and lies in the groove formed in the wheel rim, and the other of which is located at the axially-outer edge of the retaining ring and lies in the groove formed in the radially-inner surface of the separable flange and further is disposed radially opposite the reduced diameter portion of the wheel rim, the radially-inner surface of the body of the retaining ring lying against the reduced diameter portion of the wheel rim, and the radially-outer surface of the body of the retaining ring lying against the radially-inner surface of the separable flange.

2. In a wheel construction, two axially spaced side members, a wheel rim joining said side members and having a tire retaining flange on one side thereof and an annular peripheral groove formed therein near the other side thereof, said groove having in cross-section a rounded inner surface, said rim having a reduced diameter portion between the groove and the adjacent side of the rim, said reduced diameter portion constituting the outer periphery of one wheel side member and being coplanar therewith, a separable flange carried on said rim on the side opposite the first-mentioned flange and having an axially extending portion overlying the rim so as to wholly engage the tire bead on that side, said separable flange having a round-bottomed groove formed in its radially-inner surface at the edge thereof, and a split retaining ring having integral oppositely-facing annular rounded ridges, one of which is located at the axially-inner edge of the retaining ring and lies in the groove formed in the wheel rim, and the other of which is located at the axially-outer edge of the retaining ring and lies in the groove formed in the radially-inner surface of the separable flange and further is disposed radially opposite the reduced diameter portion of the wheel rim, the radially-inner surface of the body of the retaining ring lying against the reduced diameter portion of the wheel rim, and the radially-outer surface of the body of the retaining ring lying against the radially-inner surface of the separable flange.

3. In a wheel construction, two wheel side members, a wheel rim joining said side members and having a tire retaining flange on one side thereof and an annular peripheral groove formed therein near the other side thereof, said groove having in cross-section a rounded inner surface, a separable flange carried on said rim on the side opposite the first-mentioned flange and having an axially extending portion overlying the rim so as to wholly support the tire bead on that side, said separable flange having a round-bottomed groove formed in its radially-inner surface at the edge thereof, and a split retaining ring having integral oppositely facing annular rounded ridges, one of which is located at the axially-inner edge of the retaining ring and lies in the groove formed in the wheel rim, and the other of which is located at the axially-outer edge of the retaining ring and lies in the groove formed in the radially-inner surface of the separable flange and further is disposed radially opposite the outer periphery of one wheel side member, the radially-inner surface of the body of the retaining ring lying against the wheel rim, and the radially-outer surface of the body of the retaining ring lying against the radially-inner surface of the separable flange.

4. In a wheel construction, a wheel side member, a wheel rim having a tire-retaining flange on one side thereof and an annular peripheral groove formed therein near the other side thereof, a separable flange carried on said rim on the side opposite the first-mentioned flange and having an axially extending portion overlying the rim so as to wholly engage the tire bead on that side, said separable flange having a groove formed in its radially-inner surface at the edge thereof, and a split retaining ring having oppositely-facing annular ridges, one of which is located at the axially-inner edge of the retaining ring and lies in the groove formed in the wheel rim, and the other of which is located at the axially-outer edge of the retaining ring and lies in the grove formed in the radially-inner surface of the separable flange and further is disposed radially opposite the outer periphery of said wheel side member, the radially-inner surface of the body of the retaining ring lying against the wheel rim, and the radially-outer surface of the body of the retaining ring lying against the separable flange.

MARK L. MONETTE.

References Cited in the file of this patent

UNITED STATES PATENTS

| Number | Name | Date |
|---|---|---|
| 943,029 | Litchfield | Dec. 14, 1909 |
| 1,031,236 | Bosworth | July 2, 1912 |
| 1,049,442 | Booth | Jan. 7, 1913 |
| 1,493,040 | Klaus | May 6, 1924 |
| 1,499,739 | Klaus et al. | July 1, 1924 |

FOREIGN PATENTS

| Number | Country | Date |
|---|---|---|
| 363,242 | Italy | Sept. 24, 1938 |
| 522,399 | Great Britain | June 17, 1940 |
| 575,279 | Great Britain | Feb. 11, 1946 |